(12) United States Patent
Everson et al.

(10) Patent No.: US 8,107,402 B1
(45) Date of Patent: Jan. 31, 2012

(54) METHOD AND SYSTEM FOR SECURE AUTOMATED CONFERENCE SETUP

(75) Inventors: John M. Everson, Leawood, KS (US); Jason Robert-Anthony Delker, Olathe, KS (US); Prakash Sankaranaraynan, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1209 days.

(21) Appl. No.: 11/774,096

(22) Filed: Jul. 6, 2007

(51) Int. Cl.
*H04L 12/16* (2006.01)
*G06F 15/16* (2006.01)
*H04M 1/00* (2006.01)
*H04M 3/42* (2006.01)

(52) U.S. Cl. ........ 370/260; 370/261; 370/262; 709/204; 379/158; 379/202.01; 379/205.01

(58) Field of Classification Search ........................ None
See application file for complete search history.

(56) References Cited

U.S. PATENT DOCUMENTS

| 5,812,653 | A | * | 9/1998 | Jodoin et al. | 379/205.01 |
| 6,330,320 | B1 | * | 12/2001 | Cornell et al. | 379/202.01 |
| 6,741,695 | B1 | * | 5/2004 | McConnell et al. | 379/229 |
| 6,950,660 | B1 | * | 9/2005 | Hsu et al. | 455/456.1 |
| 7,167,898 | B2 | | 1/2007 | Sato et al. | |
| 7,343,008 | B1 | * | 3/2008 | Frankel | 379/202.01 |
| 2002/0194049 | A1 | * | 12/2002 | Boyd | 705/9 |
| 2004/0054724 | A1 | * | 3/2004 | Sudo | 709/204 |
| 2005/0157731 | A1 | * | 7/2005 | Peters | 370/401 |
| 2005/0163311 | A1 | * | 7/2005 | Fowler et al. | 379/900 |
| 2006/0010392 | A1 | | 1/2006 | Noel et al. | |
| 2006/0154653 | A1 | | 7/2006 | Wilson | |
| 2006/0250987 | A1 | * | 11/2006 | White et al. | 370/260 |
| 2007/0064898 | A1 | * | 3/2007 | Amano et al. | 379/168 |
| 2008/0037748 | A1 | * | 2/2008 | Jefferson et al. | 379/202.01 |
| 2008/0155031 | A1 | * | 6/2008 | Fortier et al. | 709/206 |
| 2008/0259824 | A1 | * | 10/2008 | Frankel | 370/260 |

OTHER PUBLICATIONS

Sonexis, Inc., Sonexis ConferenceManager Platform Overview, printed from World Wide Web on Oct. 12, 2006.

* cited by examiner

*Primary Examiner* — Hassan Phillips
*Assistant Examiner* — Hicham Foud (57) ABSTRACT

A method and system are disclosed for secure automated conferencing between authorized conference participants. A conference server may schedule a conference between a plurality of authorized conference participants and assign each authorized conference participant a respective unique participant-ID. The conference server may send each participant a conference message containing an actionable link that the party may invoke to join the conference. The link may designate the party's unique participant-ID and the conference bridge number. When the link is invoked, the device of the conference participant may initiate communication with the conference server and provide the unique participant-ID to the conference server. When a given party initiates communication with the conference server, the conference server may verify that the given party is an authorized conference participant. The conference server may verify that the given party is authorized by verifying that the participant-ID provided to the conference server by the given party corresponds to the unique participant-ID assigned to the given party.

16 Claims, 6 Drawing Sheets

METHOD AND SYSTEM FOR SECURE AUTOMATED CONFERENCE SETUP

FIELD OF THE INVENTION

The present invention relates to network communications and, more particularly, to secure automated conferencing between authorized conference participants.

DESCRIPTION OF RELATED ART

A conference call, such as a teleconference, is a connection among a number of conference participants. A conference call provides a much quicker and cheaper method of conducting meetings than an in-person meeting when the participants are not co-located. Accordingly, conference calls have become a very common tool for business and personal communications. To conduct a conference, a conference bridge is used. The conference bridge can reside in a telecommunications network and can function as a bridging or switching device between the conference participants to support the conference.

A host may schedule a conference with the conference bridge. The host may provide the conference bridge with a list of participants and a time at which the conference is to begin. Typically, the host would provide the conference participants with a conference bridge number to call in order to join the conference. At the scheduled time, the conference participants may then call the conference bridge number in order to join the conference.

In addition, typically the host would provide the conference participants with a conference personal identification number (PIN) or other code. The conference PIN or other code may be used to facilitate secure conferencing. Automated conferencing services may require that a party attempting to join a conference manually enter a conference PIN after calling the conference bridge number. Requiring that a party enter a conference PIN may ensure that the party calling the conference bridge is an authorized conference participant. If a party calling the conference bridge does not enter the correct conference PIN, the conference server may not allow the party to join the conference.

In typical practice, when a party attempts to join a conference, the party generally must dial the conference bridge number. Further, in addition to knowing the conference bridge number to dial, it is often necessary that a party also know a conference PIN to dial in order to join a conference. Upon a participant calling the conference bridge and entering the correct conference PIN, the conference bridge may bridge together the communication sessions, so that the conference participants can confer with each other via the conference bridge.

SUMMARY

The present invention provides a method and system for secure automated conferencing between authorized conference participants.

According to the present invention, a conference server may schedule a conference between a plurality of parties, each comprising a client device operated by a user. The conference server may send each party a respective conference message providing an actionable link that the user may invoke to join the conference. The actionable link may designate the conference bridge number and a unique participant-ID. When the user invokes the link, the party may initiate communication with the conference server and may provide the conference server with the unique participant-ID.

At the time of the conference, through invocation of the actionable link, a given party may initiate communication with the conference server and provide the conference server with a participant-ID in attempt to join the conference. The conference server may then use the participant-ID in order to verify that the given party is an authorized conference participant. The conference server may verify that the given party is authorized by verifying that the unique participant-ID provided to the conference server by the given party corresponds to the unique participant-ID assigned to the given party.

In the exemplary embodiment, a conference server may thus be operable to set up a secure conference between two or more parties, each party comprising a client device operated by a user. The conference server may bridge together communications with the client devices, to provide a conference between the client devices, and thus between users of the client devices. A conference host may provide the conference information, including an indication of the plurality of parties, to the conference server.

The conference server may then assign to each party a respective unique participant-ID that authorizes the party to participate in the conference. Further, the conference server may store correlation data correlating each party with the unique participant-ID assigned to the party. The correlation data may correlate each party with the unique participant-ID assigned to the party in various ways. For example, the correlation data may correlate the participant-ID to some identifier of the party. For instance, the correlation data may correlate the participant-ID to the phone number of the party. Alternatively, the correlation data may correlate the participant-ID to the network access identifier (NAI) of the party. The conference server may maintain this correlation data in data storage.

The conference server may then send each party a respective conference message that contains a link designating the unique participant-ID assigned to the party. The link may be actionable by the party to cause initiation of communication with the conference server and to provide the conference server with the unique participant-ID. The respective conference message may be a Short Messaging Service (SMS) message or may take other forms. Further, the respective conference message preferably includes information describing the conference, such as a conference date, a conference time, a conference subject, and a conference description.

At the time of the scheduled conference, a given party may initiate communication with the conference server in attempt to join the conference. The given party may be any party attempting to join the conference, such as a party that is authorized to join the conference or a party that is not authorized to join the conference. Responsive to a given party initiating communication with the conference server, the conference server may verify that the given party is an authorized conference participant. In order to verify that the given party is an authorized conference participant, the conference server may (i) identify the given party initiating communication, (ii) determine the unique participant-ID assigned to the identified party, and (iii) verify that the participant-ID provided to the conference server by the given party corresponds to the determined unique participant-ID.

The conference server may identify the given party initiating communication in various ways. For instance, the conference server may identify the given party based on the caller-ID of the given party. Alternatively, the given party may provide its NAI to the conference server, and the conference server may identify the given party based on this NAI of the given party. Since the conference server stored correlation data correlating each party with the unique participant-ID assigned to the party, the conference server may use this data to determine what unique participant-ID is assigned to the identified party. The conference server may then verify that the participant-ID provided to the conference server by the given party corresponds to the determined unique participant-ID. If the participant-ID provided to the conference server by the given party corresponds to the determined unique participant-ID, the conference server may allow the given party to participate in the conference. On the other hand, if the participant-ID provided to the conference server by the given party does not correspond to the determined unique participant-ID, the conference server may not allow the given party to participate in the conference.

These as well as other features, advantages, and alternatives will become apparent to those of ordinary skill in the art by reading the following detailed description, with appropriate reference to the accompanying drawings. Further, it should be understood that this summary and other descriptions herein are intended to illustrate the invention by way of example only and are not intended to limit the scope of the invention as claimed.

DETAILED DESCRIPTION

1. Overview

As indicated above, the present invention provides a method and system for secure automated conferencing between authorized conference participants. In the exemplary embodiment, a conference server may set up a conference between a plurality of parties, each comprising a client device operated by a user. The conference server may assign each party a respective unique participant-ID that authorizes the party to participate in the conference. The conference server may send each party a respective conference message providing an actionable link that the user may invoke to join the conference. The actionable link may designate the conference bridge number and the respective unique participant-ID assigned to that party. When the user invokes the link, the user's device may initiate communication with the conference server and provide the conference server with the unique participant-ID.

At the time of the scheduled conference, a given party may initiate communication with the conference server in attempt to join the conference. In particular, upon a user invoking the actionable link, the user's device may initiate communication with the conference server and provide the conference server with a participant-ID. The conference server may then use this participant-ID in order to verify that the party is an authorized conference participant. The conference server may verify that the party is an authorized conference participant by verifying that the unique participant-ID provided to the conference by the party corresponds to the unique participant-ID assigned to the party by the conference server.

2. Exemplary Communication System Architecture

Figure 1:
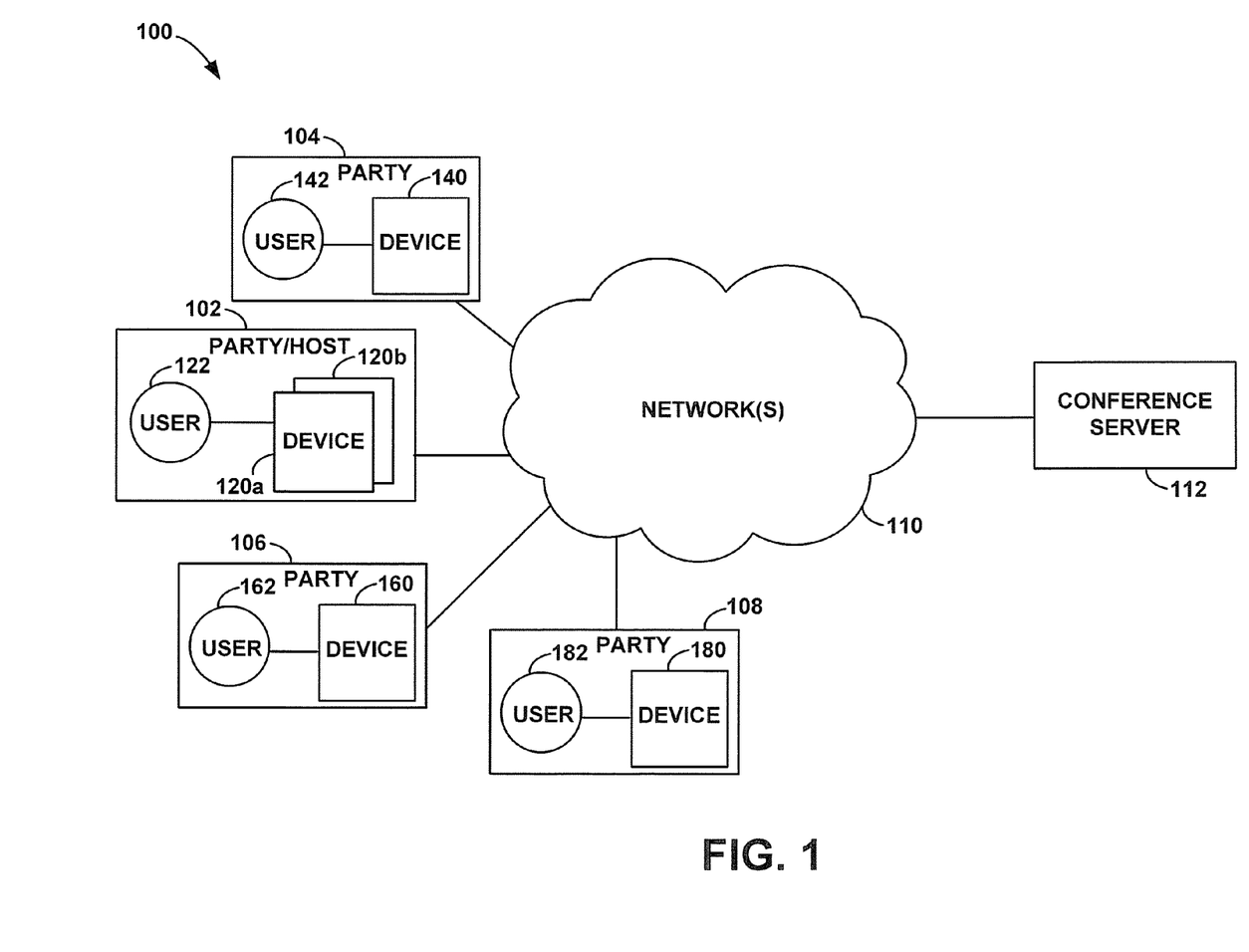
FIG. 1 is a block diagram of a communication system in which the exemplary embodiment can be employed.

FIG. 1 is a simplified block diagram of a communication system 100 in which the exemplary embodiment can be employed. Note that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and as a combination of hardware, firmware, and/or software (e.g., by processor-executed machine language instructions).

As shown in FIG. 1, system 100 includes a plurality of parties 102, 104, 106, 108 and a conference server, all of which are coupled with a network 110. Each party includes a client device operated by a user. As shown, party 102 includes client device 120 operated by user 122, party 104 includes client device 140 operated by user 142, party 106 includes client device 160 operated by user 162, and party 108 includes client device 180 operated by user 182. With this arrangement, conference server 112 can function to bridge together communications with the client devices, to provide a conference between the client devices, and thus between users of the client devices.

As further shown, party 102 may be a conference host, responsible for initially arranging, or scheduling, the conference with server 112. Further, party 102 may also be one of the participants in the scheduled conference. Alternatively, party 102 may arrange for a conference among parties 104-108 without participating in the conference. It should be understood that the depiction of these four parties is merely an example. There may be a greater number of parties participating in a conference, or, alternatively, a fewer number of parties participating in a conference.

Each client device may be any user device that can be used for communications, such as a telephone, a cellular phone, a personal digital assistant, a personal computer, or other telecommunication devices. Further, party 102 is depicted in FIG. 1 as comprising two client devices. User 122 may use the same client device to schedule the conference and to later participate in the conference. Alternatively, user 122 may use one client device 120a to schedule the conference and a different client device 120b to participate in the conference. For instance, client device 120a may be a personal computer connected to the internet and client device 120b may be a cellular phone. Still alternatively, user 122 may schedule a conference but not participate in the conference.

Network 110 may provide a communication pathway between parties 102-108 and the conference server 112. While network 110 is depicted in FIG. 1 as a single network, it should be understood that network 110 may include multiple networks. For example, network 110 may be a circuit-switched network, such as the public switched telephone network ("PSTN"). Additionally or alternatively, the network may be a packet-switched network, such as the Internet or an intranet. Further, each party may be connected to the conference server via a different network. Still further, a party may be connected to the conference server via multiple networks.

3. Exemplary Operation

Figure 2:
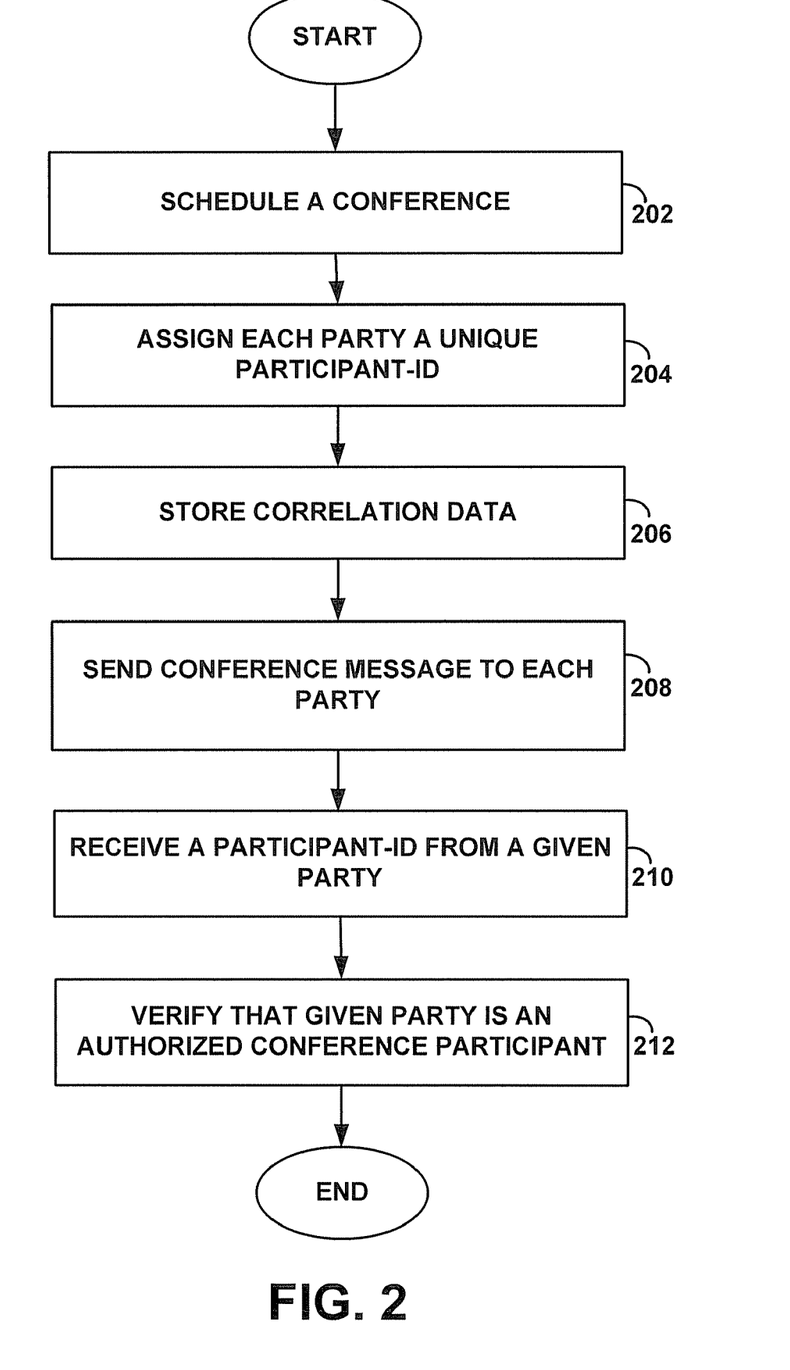
FIG. 2 is a flow chart depicting a method for secure conferencing that can be carried out in accordance with the exemplary embodiment.

FIG. 2 is a flow chart illustrating a method of secure automated conferencing between authorized conference participants in accordance with the exemplary embodiment. The example of FIG. 2 shows steps performed by party 102 and conference server 112. However, it should be understood that these are functional steps and the steps can be carried out by additional entities. For example, conference server 112 may be a combination of conference servers. Further, some of the steps may be performed by a third party call control server.

As shown in FIG. 2, at step 202, user 122 may schedule a conference with the conference server. In order to schedule a conference with the conference server, user 122 may, for example, use a web-based provisioning service to schedule the conference. This service may be a web-based program that allows a user to enter conference information, such as the time of the conference and the desired conference participants. The web based service may then operate to communicate this information to conference server 112 in order to schedule the conference with the conference server.

In accordance with the exemplary embodiment, user 122 may schedule a conference between a plurality of parties. For example, user 122 may schedule a conference between parties 102-108. Alternatively, if party 102 is not participating in the conference, the user may schedule a conference between parties 104-108.

User 122 may use client device 120 in order to access the web-based provisioning service. Client device 120 may include a browser that user 122 could use in order to access the web-based provisioning service. For example, the browser could be a HyperText Markup Language ("HTML") browser, a Java 2 Platform, Micro Edition ("J2ME") browser, or a Wireless Application Protocol ("WAP") browser.

User 122 may provide conference server 112 with a list of conference participants and identification of the client devices associated with the participants. For example, the identification of a client device may be the phone number of the client device. Other examples of a device identifier include a Network Access Identifier ("NAI"), an Electronic Serial Number ("ESN"), a Mobile Directory Number ("MDN"), a Mobile Equipment ID ("MEID"), and an International Mobile Equipment Identity ("IMEI") number. Additionally or alternatively, user 122 may provide a pointer to a pre-defined group, such as a "buddy list" or a personal address book. In addition, if user 122 plans to participate in the conference, the user may also provide conference server 112 with information, such as the device identifiers mentioned above, on how to contact client device 120.

In addition to identifying the conference participants, user 122 may provide conference server 112 with information about the conference. The user may provide a time for the scheduled conference. Further yet, the user may provide the other information about the scheduled conference, such as a conference date, conference subject, and a conference description.

At step 204, the conference sever may assign each party to the conference a unique participant-ID that authorizes the party to participate in the conference. Therefore, conference server 112 may assign unique participant-IDs to parties 102-108. Alternatively, if the host is not participating in the conference, conference server 112 may assign unique participant-IDs to parties 104-108. In the exemplary embodiment, each party assigned a unique participant-ID is an authorized conference participant.

At step 206, the conference server may store correlation data that correlates each party with the unique participant-ID assigned to the party. Correlation data may correlate each unique participant-ID with some device identifier of the device of the party that the unique participant-ID was assigned to. For instance, correlation data may correlate each respective unique participant-ID to the respective phone number of the device of each party. Additionally or alternatively, correlation data may correlate each respective unique participant-ID to the NAI, ESN, MDN, MEID, or IMEI number of the device of each party. In addition to assigning the unique participant-ID, conference server 112 may also generate a conference bridge number that will be used for the scheduled conference.

At step 208, the conference server may send each party a respective conference message. The conference message may take a variety of forms. For example, conference server 112 may send each party an SMS message, an email message, a meeting invite message sent via email, or a WAP Push message. Other forms of the conference message are possible as well. Conference server 112 may send the respective conference messages via network 110. Therefore, conference server may send parties 102-108 a respective conference message.

The respective conference message may contain a link designating the unique participant-ID assigned to the party. The link may also designate the conference bridge number and the conference bridge-ID. Preferably, this link is actionable by a user to cause initiation of communication with conference server 112 and to provide the conference server with the unique participant-ID. The link may take a variety of forms. For example, the link may be a unique uniform resource locator (URL). The URL may take various forms. For example, the URL may be a SIP URL, a Telephone Uniform Resource Locator ("TEL") URL, a dialto command URL, or a HyperText Transfer Protocol ("HTTP") link. Other URLs are possible as well. Alternatively, the link may be an SMS link.

As mentioned, the URL may be a SIP URL. The SIP URL may include the unique participant-ID. For example, the SIP URL may be "sip:92389523@confserv.sprint.com", where 92389523 is the unique participant-ID. Alternatively, the SIP URL may include the unique participant-ID and the conference bridge number. For example, the SIP URL may be "sip:92389523.5555551212@confserv.sprint.com", where 92389523 is the unique participant-ID and 5555551212 is the conference bridge number. However, since the participant code is unique, the conference bridge number is not necessary because the conference server may determine which conference bridge to connect a user to based on the unique participant-ID.

Alternatively, the URL may be a TEL URL. TEL URLs are defined in, for example, the publicly available document "URLs for Telephone Calls," RFC 2806 (April 2000), which is incorporated by reference. An example of a TEL URL may be "tel:+358-555-1234567;postd=pp 22". This TEL URL instructs the client device to place a voice call to +358-555-1234567, then wait for an implementation dependent time (for example, two seconds) and emit two DTMF dialing tones "2" on the line. The TEL URL may include the conference bridge number and the unique participant-ID.

Still alternatively, the URL may be a dialto command URL. The dialto command may operate similarly to a mailto command. As is known in the art, a mailto command followed by an email address, such as mailto:sprint@sprint.com, indicates to an that the text following the mailto command is a highlightable piece of text. Similarly, a dialto command may instruct a client device that what is behind a dialto command is a highlightable piece of text. The client device may include program logic that is capable of recognizing that a dialto command followed by a string indicates a URL. For example, the dialto command URL may be "dialto:555-555-1212,,,,5493264#", where 866-555-1212 is the conference bridge number and 5493264 is the unique participant-ID. In this case, the program logic of the client device may be operable to highlight "dialto:555-555-1212,,,,54932644". The program logic may be operable to, upon a user of the client device invoking the highlighted link, send the string behind the dialto command to the dialer of the client device.

At the time of the scheduled conference, a given party may initiate communication with conference sever 112 in attempt to join the scheduled conference. However, before allowing a given party to join the scheduled conference, conference server 112 may verify that the given party is an authorized conference participant.

At step 210, the conference server may receive a participant-ID from the given party initiating communication with the conference server. The given party may be an authorized conference participant. For example, the given party could be party 102, 104, 106, or 108. Upon a user invoking the actionable link, the user's device may initiate communication with conference server 112 via network 110 and may provide the conference server with a participant-ID. Alternatively, the given party could be a party (not depicted) that is not an authorized conference participant. For example, the given party could be a party that received a conference message as a forward from party 102, 104, 106, or 108.

After a given party initiates communication with conference server 112, at step 212, conference server 112 may verify that the given party is an authorized conference participant. Conference server 112 may verify that the given party is an authorized conference participant by identifying the given party initiating communication and determining the unique participant-ID that was assigned to the identified party. Conference server 112 may then verify that the participant-ID provided by the given party corresponds to the determined unique participant-ID. If the participant-ID provided by the given party corresponds to the determined unique participant-ID, conference server 112 may allow the given party to join the conference. On the other hand, if the participant-ID provided to conference server 112 does not correspond to the determined unique participant-ID, the conference server may not allow the given party to participate in the conference.

In the exemplary embodiment, for a particular conference, the conference server may only allow a unique participant-ID to be used one time for the particular conference. For example, two parties may not join the same conference using the same unique participant-ID. If the conference server allows a user to join a conference using a participant-ID, the conference server may not allow a second user using the same participant-ID to join the conference.

Further, in the exemplary embodiment, conference server 112 may send a party multiple conference messages. For example, conference server 112 could send a party an initial conference message and a reminder conference message. The initial message could be sent when the conference was initially scheduled. For instance, if the conference was scheduled a week before the conference, the initial conference message could be sent at this time. Conference server 112 could send the conference reminder message a certain time in advance of the scheduled conference. For instance, conference server 112 could send the conference reminder message approximately 15 minutes before the scheduled conference. This is beneficial because it provides the participants with easy access to the conference message and the actionable link. In this case, a conference participant would not have to search for the initial conference message sent a week before the scheduled conference. Finding this message may be difficult. The reminder conference message is also beneficial because it may operate to remind the conference participant that they are scheduled to participate in a conference.

Figure 3:
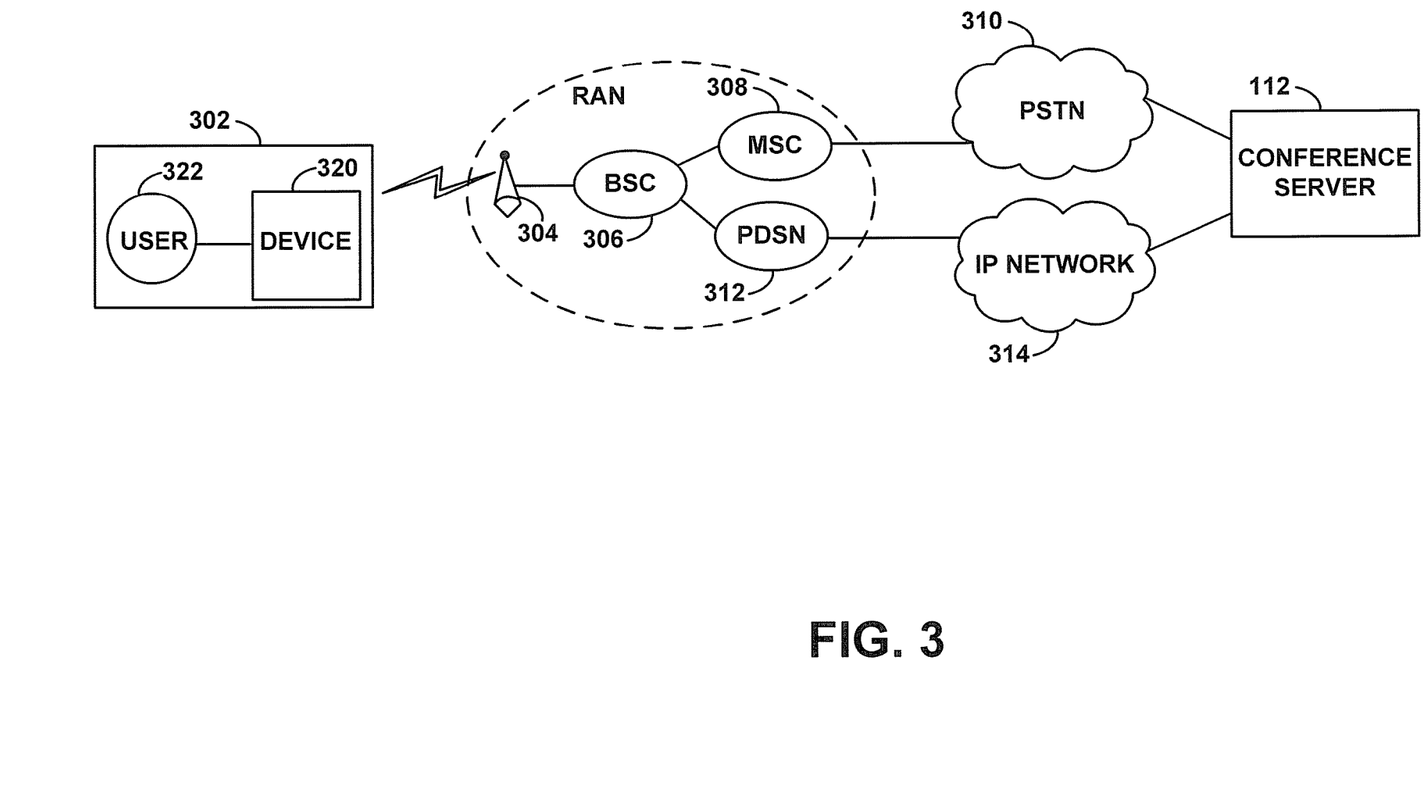
FIG. 3 is a block diagram of a section of the communication system of FIG. 1 in which the exemplary embodiment can be employed.

FIG. 3 is a more detailed block diagram of a section of the communication system 100 of FIG. 1. FIG. 3 details an exemplary network connection between a conference party 302 and conference server 112. Party 302 comprises a client device 320 operated by a user 322. FIG. 3 is merely an example of how a party 302 may be connected to conference server 112 and is not a limitation on the possible network connection. Further, for the purposes of discussion with reference to FIG. 3, party 302 could be any party that is an authorized conference participant. For instance, party 302 may be the party 102, 104, 106, or 108.

As depicted in FIG. 3, client device 320 may communicate with a base transceiver station ("BTS") 304 through an air interface. Client device 320 can communicate with BTS 304 via the air interface using a variety of different protocols. In one exemplary embodiment, the air interface may be a code division multiple access ("CDMA") air interface, and communications between client device 320 and BTS 304 may comply with industry standard such as cdma2000, which is published by the $3^{rd}$ Generation Partnership Project 2. However, the air interface could follow other protocols as well, such as Evolution-Data Optimized ("EV-DO"), Time Division Multiple Access ("TDMA"), Global System for Mobile communications ("GSM"), or 802.11x for instance.

BTS 304 couples to a base station controller ("BSC") 306, which may in turn be coupled with a mobile switching center ("MSC") 308. The MSC 308 can manage setup and teardown of connections with client device 320. While BSC 306 and MSC 308 are depicted as separate components, it is possible that their functionality may be combined in a single component.

MSC 308 can additionally provide connectivity to the public switched telephone network ("PSTN") 310. Using this connectivity, client device 320 might communicate with other devices and entities that are also connected to PSTN 310, such as conference server 112. For example, client device 320 might form a circuit switched connection with conference server 112 and then exchange voice and/or data traffic over the circuit-switched connection.

In addition to connecting to MSC 308, BSC 306 might also connect with a packet data serving node ("PDSN") 312. The PDSN 312 may in turn provide connectivity to a packet data network, such as IP Network 314, an intranet, or another packet data network. Client device 320 can use this connectivity to communicate with other devices and entities that are also connected to IP Network 314, such as conference server 112.

4. Conference Setup and Initiation in the Exemplary Communication Architecture

In the exemplary communication architecture depicted in FIG. 3, it is possible to establish a conference leg between party 302 and the conference server 112. While the following is described in reference to a single party, it should be understood that conference server 112 may establish a conference leg for each party to the conference. The conference server could then, in turn, bridge together those legs so that the parties could engage in a conference session.

In practice, conference server 112 may establish a conference leg between the server and party 302 in a variety of ways. The process of establishing a conference leg may differ depending on the network link between the party and the conference server.

For example, when the network link between client device 320 and the conference server 112 is a packet-data link, such as IP Network 314, a signaling mechanism such as the well known Session Initiation Protocol (SIP) could be used to establish a conference leg. Alternatively, when communicating over a circuit-switched link, such as PSTN 310, the party may call the conference server 112 in order to establish a circuit-switched call path between it and the conference server 112.

SIP is an example of a publicly-defined network protocol, in that it is defined in, for example, the publicly available document "SIP: Session Initiation Protocol," RFC 3261 (June 2002), which is incorporated by reference. A communication session may be set up between two entities, such as client device 320 and conference server 112, by the first entity sending the second entity a SIP "INVITE" request. The second entity may then transmit a "200 OK" response to the first entity. When this response is acknowledged by the first entity transmitting an "ACK" message to the second entity, the communication session may then be established.

SIP responses are typically associated with a three-digit number, which places the response in a class of responses. Responses of the form "1xx" ("180 Ringing") are known as provisional or informational responses, and indicate that the request is progressing but is not yet complete. "2xx" responses ("200 OK") indicate success, meaning that the request has completed successfully. "3xx" responses ("302 Moved Temporarily") indicate redirection, meaning that the requesting party should send the request to another location. "4xx" responses ("486 Busy Here"), "5xx" responses ("503 Service Unavailable"), and "6xx" responses ("603 Decline") indicate that some type of error or failure has occurred.

As mentioned in reference to FIG. 2, communication server 112 may send party 302 a conference message containing an actionable link. When user 322 invokes the link, client device 320 may initiate communication with conference server 112. Client device 320 may send a first request message, such as a SIP INVITE message, to the conference server. The device may also send to the conference server the unique participant-ID that is associated with the link. The device may send this unique participant-ID in various ways. For example, the SIP INVITE message may include a SIP header, and the SIP header may include the unique participant-ID.

In accordance with the exemplary embodiment, conference server 112 may identify the device initiating communication. In the exemplary embodiment, conference server 112 may identify the device initiating communication based on the device's NAI. The NAI is typically assigned to the mobile device in association with the user's mobile service plan. An NAI may take the form username@domain, such as johnqpublic@sprint.com for instance. Client device 320 may send its NAI in a SIP header. Alternatively, conference server 112 may identify the device initiating communication based on the device's caller-ID. Other examples of a device-ID which could be sent in a SIP header include the device's ESN, MDN, MEID, or IMEI number. Further, the conference server could query the MSC in order to find the device's identification, such as the device's ESN. Additionally or alternatively, network 110 may include a Home Location Register ("HLR"), and the conference server could query the HLR in order to find the device's identification, such as the device's ESN.

After receiving a unique participant-ID from client device 320, conference server 112 may verify that party 302 is an authorized conference participant. Conference server 112 may use the correlation data to determine the unique participant-ID assigned to the identified party. Conference server 112 may then verify that the provided participant-ID corresponds to the identified participant-ID. If conference server 112 verifies that party 302 is an authorized conference participant, the conference server may send a signaling system reply message, such as a SIP OK message (e.g., 200 OK message) to client device 320. After client device 320 has received a SIP OK message from conference server 112, client device 320 may send an acknowledgement message, such as a SIP ACK message, to conference server 112.

If conference server 112 determines that party 302 is not an authorized participant, conference server 112 may not allow the party to join the conference. In this case, conference server 112 may send a SIP 603 Decline message to client device 320. Alternatively, conference server could send a SIP 486 Busy Here or a SIP 503 Service Unavailable message to client device 320.

Alternatively, as discussed above, client device 320 may communicate with conference server 112 over a circuit-switched link, such as PSTN 310. In this case, client device 320 may call the conference server 112 in order to establish a circuit-switched call path between it and the conference server 112. In usual practice, for instance, to place a call over PSTN 310, client device 320 may transmit a call origination message over an air interface access channel to BTS 304, providing dialed digits. BTS 204 may send the call origination message to MSC 208. Upon receipt of the call origination message, MSC 308 may then direct BSC 306 to assign an air interface traffic channel for use by client device 320 to engage in the call, and MSC 308 may set up the call over PSTN 310 to the called number. In particular, MSC 318 may engage in ISDN User Part (ISUP) signaling over a signaling network, such as a Signaling System #7 (SS7) network, with a switch serving the called party, in an effort to set up the call over PSTN 310 to that party.

With this basic arrangement, client device 320 can place and receive calls over PSTN 310. For instance, to place a call to conference server 112, client device 320 may send a call origination message over an access channel on air interface to BTS 304, which would provide MSC 308 with dialed digits representing the conference bridge number for the scheduled conference.

When client device 320 has a circuit-switched connection to conference server 112, conference server may send a conference message containing an actionable link to client device 320. The conference message is preferably an SMS message. Alternatively, the conference message may be an email or a WAP Push message.

When communicating over a circuit-switched link, client device 320 may call the conference server 112 in order to establish a circuit-switched call path between it and the conference server 112. Therefore, upon user 322 of client device 320 invoking the link of the conference message, the device may dial a conference string in order to initiate communication with conference server 112 and provide conference server 112 with the participant-ID.

The conference string may be a dialed digit string. Further, the conference string may contain the conference bridge number and the participant-ID. Alternatively, the conference string may contain the conference bridge number, the conference bridge-ID, and the participant-ID. It is well known that when a user clicks on a link to a phone number in an SMS message, the client device may dial that phone number. Similarly, when a user clicks on a link to a digit string, such as the conference string, the client device may dial that entire conference string.

For example, the conference bridge number could be 1-800-555-9999, the conference bridge-ID could be 1234, and the participant-ID could be 987654. Therefore, upon a user of the device invoking the link of the conference message, the device may dial a conference string such as "18005559999,,,,1234**987654#". The commas may operate to insert a pause in the dialing process of the client device, the star (*) signs may signify to the conference server the separation between the conference bridge-ID and the participant-ID, and the pound (#) sign may signify to the conference server the end of the participant-ID. Alternatively, the star sign may signify to the conference server the separation between the conference bridge-ID and the participant-ID and the star sign may signify to the conference server the end of the participant-ID. In this case, the conference string may be "18005559999,,,,1234##987654*".

Alternatively, the conference string could be "18005559999,,,,,987654#". In this case, the conference string includes the conference bridge number and the unique participant-ID. Since the participant-ID is unique, the conference server may be able to determine which conference bridge the user is trying to reach based on the unique participant-ID. Alternatively, the conference bridge-ID could be incorporated in the participant-ID string. Other variations of the conference string are possible as well Placing a comma or commas between the conference bridge number and the conference bridge-ID and participant-ID will allow the phone to pause the dialing process for a certain amount of time before dialing the PIN and participant-ID. For example, the client device may pause the dialing process for 2 seconds for each comma. By placing these commas after the conference bridge number, the client device will not dial the remaining digits until after the time defined by the commas has ended. For instance, in the case of a conference string containing four commas and where each comma causes a two second delay, the time delay would be eight seconds. This time delay may be greater than the amount of time it takes to ring and connect to the conference server. This delay is useful because it allows the client device to first connect with the conference server before providing the conference server with the conference bridge-ID and participant-ID.

After receiving a unique participant-ID from client device 320, conference server 112 may verify that party 302 is an authorized conference participant. Conference server 112 may identify the participant-ID provided to the conference server from the conference string. Conference server may also identify the caller-ID of client device 320. Conference server 112 may use the correlation data to determine the unique participant-ID assigned to the identified party. Conference server 112 may then verify that the provided participant-ID corresponds to the identified participant-ID. If conference server 112 verifies that party 302 is an authorized conference participant, the conference server may allow party 302 to join the conference. If conference server 112 determines that party 302 is not an authorized participant, conference server 112 may not allow the party to join the conference. In this case, conference server 112 may ignore the call origination request. Alternatively, conference server 112 may indicate to the party that it is not an authorized conference participant. For instance, conference server may play out a message to the party stating that it is not authorized to join the conference.

5. Exemplary Mobile Station Components

Figure 4:
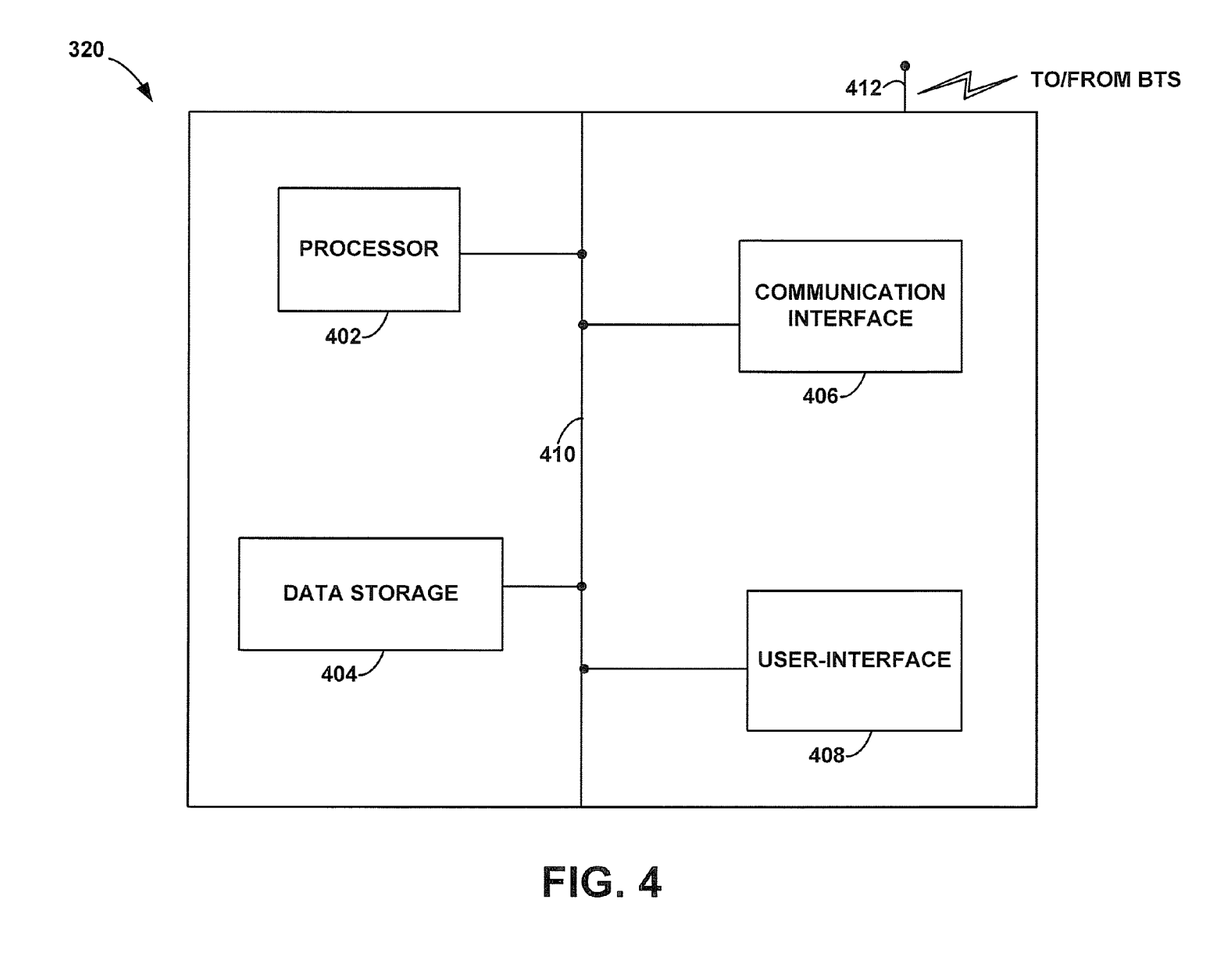
FIG. 4 is a block diagram of an exemplary client device that can be used in the arrangement of FIG. 1.

A block diagram of an exemplary client device 320 is provided in FIG. 4, in order to illustrate some of the components that could be included in such a device to carry out the exemplary embodiment. While client device 320 is depicted as a mobile station, client device 320 need not be a mobile station in order to carry out the exemplary embodiment. For instance, client device 320 could be a computer, such as a VoIP capable computer.

As shown in FIG. 4, client device 320 may include a processor 402, data storage 404, a wireless communication interface 406, and a user interface 408, all of which may be coupled together by a system bus or other mechanism 410. Each of these components may take various forms.

For instance, processor 402 could be one or more general purpose microprocessors and/or dedicated signal processors. Data storage 404 could be volatile and or nonvolatile memory, such as flash memory or a storage drive. Wireless communication interface 406 could comprise a chipset (not shown) compliant with a desired air interface protocol such as CDMA, EV-DO, TDMA, GSM, or 802.11x for instance. Further, the wireless communication interface may include an antenna 412 for sending and receiving signals over an air interface.

User interface 408, in turn, may facilitate interaction with a user, to receive voice from a user and play out voice to a user, and to receive user instructions to initiate or conclude a conference session. By way of example, the user interface may include a microphone (not shown) for receiving analog speech signals from a user and a speaker (not shown) for playing out analog speech signals to a user. Further, user interface may include analog-to-digital conversion circuitry (not shown) for converting between analog voice signals and digital voice signals. And still further, the user interface may include a button, such as a TALK or an ENTER button, which the user can engage in order to invoke the conference message link provided to the user by the conference server.

In the exemplary embodiment, data storage 404 holds a set of logic (e.g., computer program instructions) executable by processor 402 to carry out various functions described herein. Alternatively, the logic may be embodied in firmware and/or hardware. For example, in response to user actuation of the button to invoke the conference message link, the logic may cause the processor to initiate communication with the conference server and provide the conference server with the unique participant-ID associated with the link.

The program instructions may also define SIP client logic for engaging in IP-based conference setup signaling, such as SIP signaling. In a preferred embodiment, when a user actuates the button to invoke the conference message link, program instructions may cause the client device to send the conference server a SIP INVITE message having a SIP header, where the header includes the unique participant-ID associated with the link.

Additionally, when client device 320 communicates over a circuit switched link and dials a conference string upon user actuation of the actionable link, program logic may cause the client device to mute the audio output of the device while dialing the conference string.

6. Exemplary Conference Server

Figure 5:
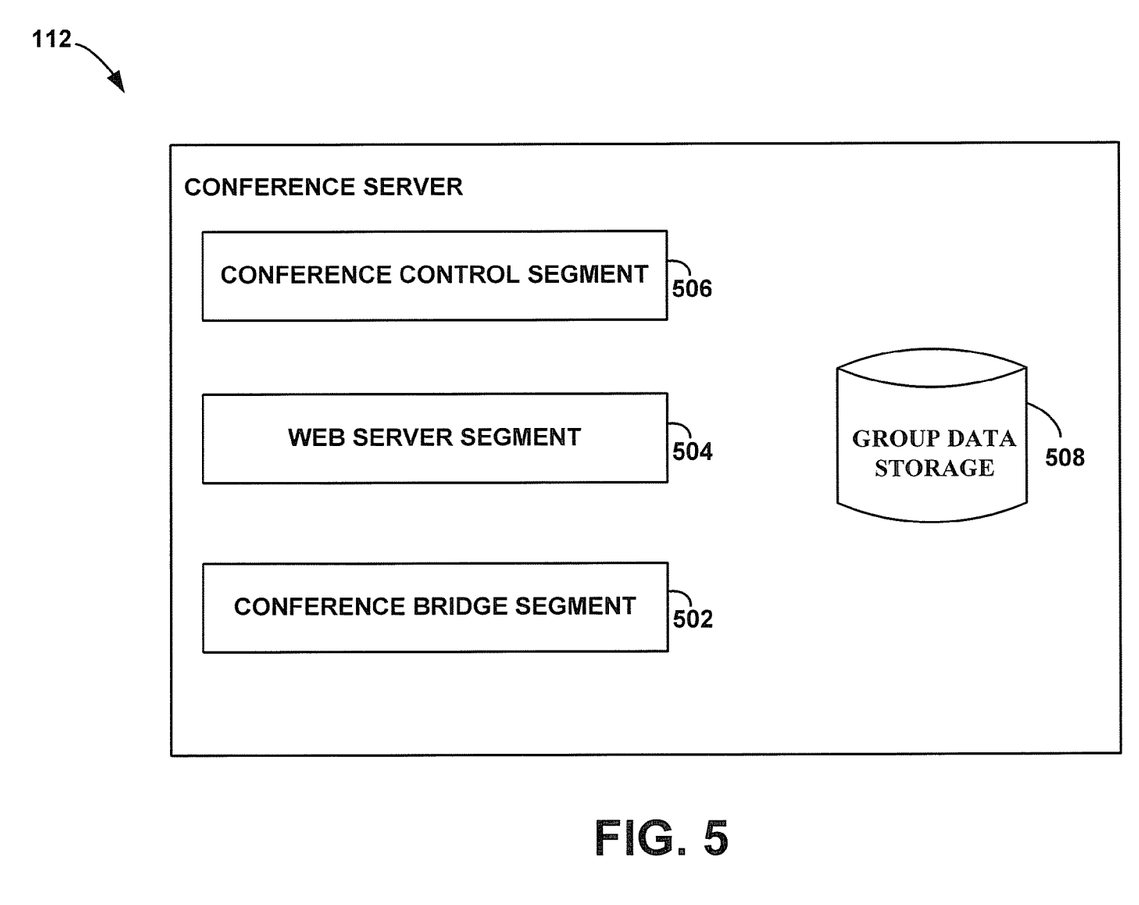
FIG. 5 is a block diagram of an exemplary conference server that can be used in the arrangement of FIG. 1.
Figure 6:
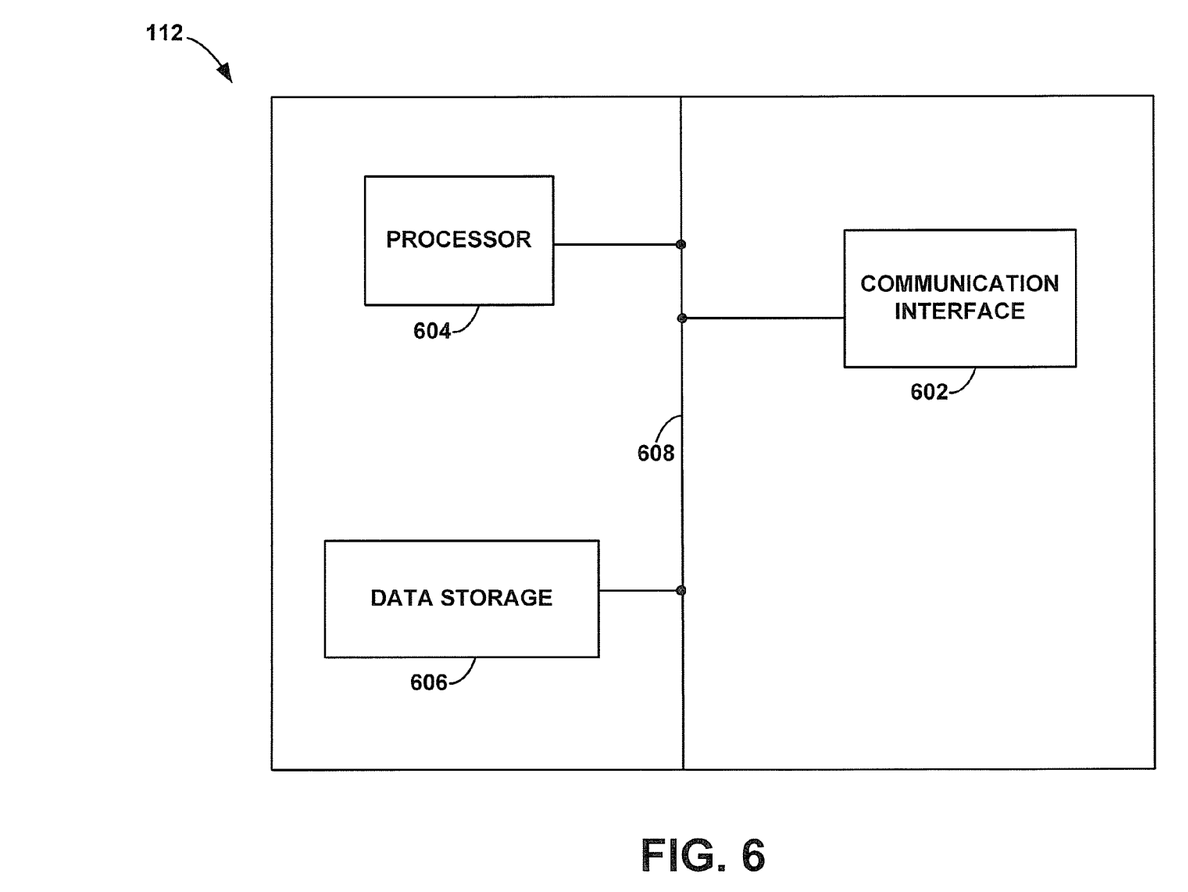
FIG. 6 is another block diagram of an exemplary conference server that can be used in the arrangement of FIG. 1.

FIGS. 5 and 6 are simplified block diagrams of conference server 112 that is used for coordinating conference setup and hosting the conference. While conference server 112 is depicted in these figures as a single entity, it should be understood that conference server 112 may be several discrete entities in communication with each other.

FIG. 5 is a block diagram of an exemplary conference server, illustrating server segments preferably contained in such a server. Conference server 112 has a conference bridge segment 502, a web server segment 504, a conference control segment 506, and a data storage segment 508.

Conference bridge segment 502 is preferably operable to support a conference between a plurality of parties. Web server segment 504 is preferably operable to communicate with a web-based provisioning service. As mentioned above, the host of the conference may use a web-based provisioning service to schedule the conference. Web server segment 504 is preferably operable to receive from the web-based provisioning service a request to schedule a conference between the plurality of parties. The host may enter the plurality of parties the host wishes to include in the conference. Web server segment 504 is then preferably operable to forward the request to schedule the conference to conference control segment 506.

After receiving the request from web server segment 504, the conference control segment is preferably operable to schedule the conference between the plurality of parties. The conference control segment 506 may assign each party a respective unique participant-ID. Conference control segment is preferably operable to store correlation data in data storage 508 correlating each party with the unique participant-ID assigned to the party. Conference control segment may then provide to each party a respective conference message containing a link designating the respective unique participant-ID assigned to the party. As described above, this link is actionable by a user to cause initiation of communication with conference server 112 and to provide conference server 112 with the unique participant-ID.

Upon a party initiating communication with conference server 112 and providing a participant-ID, conference control segment is preferably operable to verify that the party is an authorized conference participant. As noted above, conference server 112 may be several discrete entities. Therefore, conference control segment may be a discrete entity, such as a separate third party conference control segment. For instance, the third party conference segment may be a third party call control server.

FIG. 6 is another block diagram of an exemplary conference server. This figure in particular illustrates the functional components preferably contained in such a server. As shown, the exemplary conference server includes a communication interface segment 602, a processor 604, and data storage 606, all of which may be tied together by a system bus, network, or other mechanism 608.

Communication interface segment 602 may comprise a network communication interface. For example, the network communication interface may be an Ethernet network interface module to facilitate communication over a packet-switched network with served client devices and with other conference servers. Alternatively, the communication interface may comprise a plurality of conference ports for connecting directly with circuits or networks tied to the various client devices and conference servers. For example, these networks may include multiple packet-switched and circuit-switched networks.

Processor 604 comprises one or more general purpose and/or special purpose processors (such as INTEL, processors, and/or discrete digital signal processors). Data storage 606, in turn, comprises one or more volatile and/or non-volatile storage segments and can be integrated in whole or in part with processor 604. Data storage 606 preferably contains program instructions executable by processor 604 to carry out the various conference server functions described above.

7. Example Advantages

From the perspective of an authorized conference participant, joining the secure conference would be a straightforward process. In fact, all that would matter from the user's perspective is that the user receives a conference message containing an actionable link and invokes the link at the time of the scheduled conference. This method and system avoids the need for a user to know a conference bridge number and conference PIN in order to join a conference. However, the method and system ensures that a conference is secure without requiring the conference participant to enter a conference PIN.

8. Conclusion

An exemplary embodiment of the present invention has been described above. Those skilled in the art will understand, however, that changes and modifications may be made to this embodiment without departing from the true scope and spirit of the present invention, which is defined by the claims.

We claim:

1. A method for secure automated conferencing between authorized conference participants, the method comprising:
scheduling a conference between a plurality of parties;
assigning to each party a respective unique participant-ID;
assigning a conference bridge number for the conference;
storing correlation data correlating each party with the unique participant-ID assigned to the party;
sending to each party a respective conference message containing a link designating the respective unique participant-ID assigned to the party, wherein the link is actionable by the party to cause initiation of communication with a conference server and to provide the conference server with a conference string, wherein the conference string comprises the conference bridge number and the unique participant-ID; and
receiving into the conference server, from a given party, a participant-ID and verifying that the given party is an authorized conference participant, wherein verifying that the given party is an authorized conference participant comprises (i) identifying the given party initiating communication, (ii) using the correlation data to determine the unique participant-ID assigned to the identified party, and (iii) verifying that the participant-ID provided to the conference server by the given party corresponds to the determined unique participant-ID.

2. The method of claim 1, further comprising:
allowing the given party to participate in the conference if the participant-ID provided to the conference server by the given party corresponds to the determined unique participant-ID; and
not allowing the given party to participate in the conference if the participant-ID provided to the conference server by the given party does not correspond to the determined unique participant-ID.

3. The method of claim 1, wherein scheduling the conference between the plurality of parties comprises scheduling the conference through a web-based interface.

4. The method of claim 1, wherein the link comprises a uniform resource locator (URL).

5. The method of claim 4, wherein the URL is selected from the group consisting of a SIP URL, a TEL URL, and a dialto command URL.

6. The method of claim 1, wherein each respective conference message comprises a Short Messaging Service (SMS) message.

7. The method of claim 1, wherein each respective conference message further contains conference information selected from the group consisting of a conference date, a conference time, a conference subject, and a conference description.

8. The method of claim 1, wherein identifying the given party initiating communication comprises identifying a caller-ID of the given party.

9. The method of claim 1, wherein identifying the given party initiating communication comprises identifying a network access identifier of the given party.

10. The method of claim 1, wherein the conference message comprises a conference reminder message, and wherein sending to each party a respective conference message comprises sending the conference reminder message a certain time in advance of the conference.

11. A system for secure automated conferencing, the system comprising:
a client device; and
a conference server operable to set up a conference between two or more client devices, including the client device,
wherein the conference server is operable to (i) schedule a conference between a plurality of parties, (ii) assign to each party a respective unique participant-ID, (iii) store correlation data correlating each party with the unique-participant-ID assigned to the party, and (iii) send to each party a respective conference message containing a link designating the unique participant-ID,
wherein the client device is operable to (i) receive the respective conference message, and (ii) upon a user of the client device invoking the link, initiate communication with the conference server and provide the conference server with the unique participant-ID,
wherein the conference server is further operable to (i) identify the client device initiating communication, (ii) determine the unique participant-ID assigned to the identified client device, (iii) receive the unique participant-ID from the client device, and (iv) verify that the participant-ID provided to the conference server by the client device corresponds to the determined unique participant-ID, and
wherein, upon a user of the client device acting on the link, the client device is operable to dial a conference string, wherein the conference string comprises a conference bridge number and the unique participant-ID.

12. The system of claim 11, wherein the client device communicates with the conference server via a packet-data link.

13. The system of claim 12, wherein, upon a user of the client device invoking the link, the client device sends a Session Initiation Protocol (SIP) INVITE message to the conference server, wherein the SIP INVITE message carries the unique participant ID.

14. The system of claim 13, wherein the client device has a network access identifier, and wherein the SIP INVITE message further carries the client device's network access identifier.

15. The system of claim 11, wherein the client device communicates with the conference server via a circuit-switched link.

16. The system of claim 11, wherein the client device comprises logic operable to mute an audio output of the client device while dialing the conference string.

* * * * *